A. WINSTON.
CAR-BRAKES AND STARTERS.
No. 193,435.  Patented July 24, 1877.
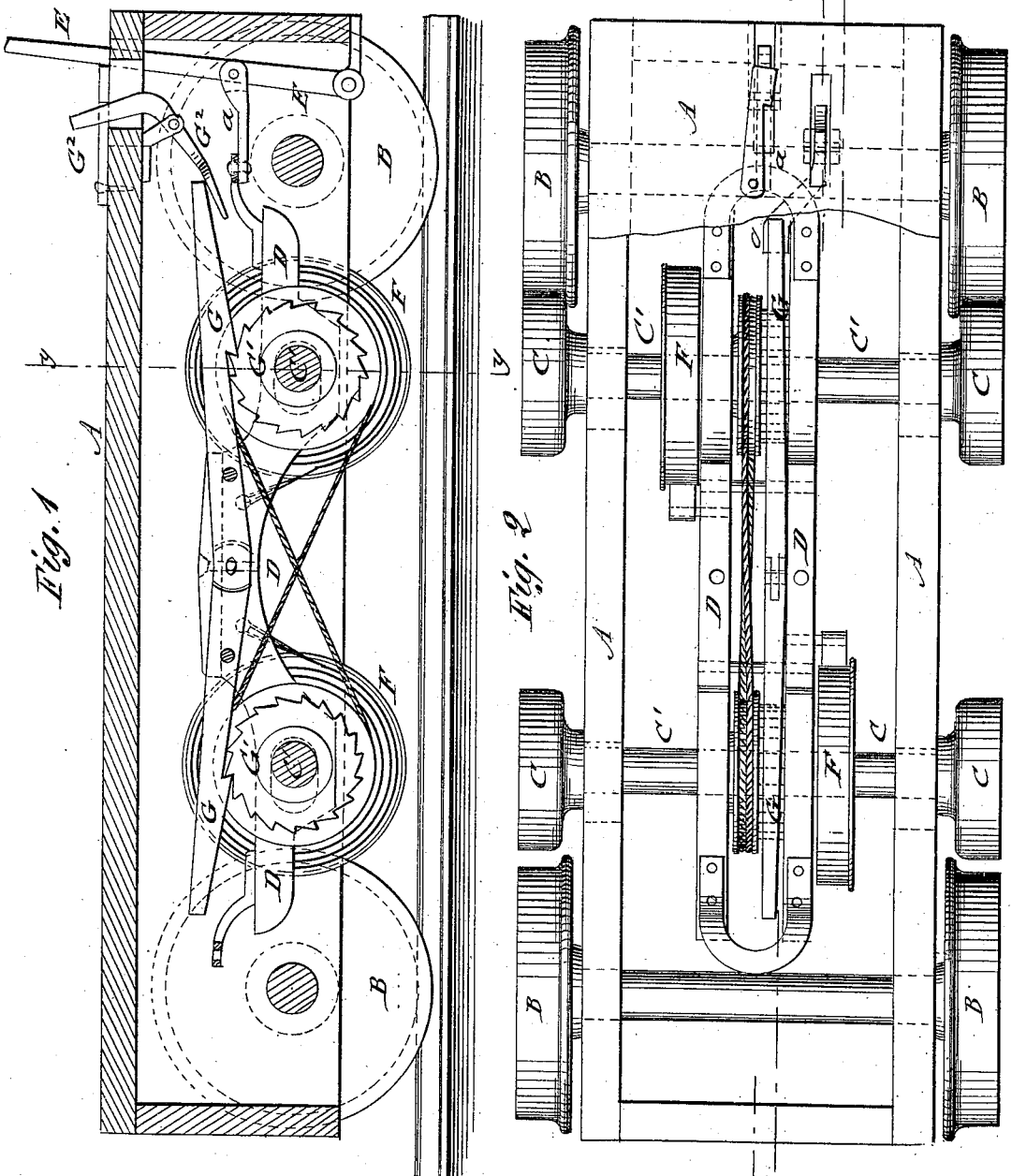
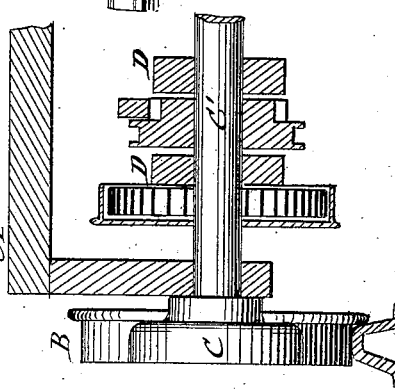
WITNESSES:
C. Neveux
J. H. Scarborough
INVENTOR:
A. Winston
BY
ATTORNEYS.

UNITED STATES PATENT OFFICE.

ALEXANDER WINSTON, OF FAYETTE, IOWA.

IMPROVEMENT IN CAR BRAKES AND STARTERS.

Specification forming part of Letters Patent No. 193,435, dated July 24, 1877; application filed May 28, 1877.

*To all whom it may concern:*

Be it known that I, ALEXANDER WINSTON, of Fayette, in the county of Fayette and State of Iowa, have invented a new and Improved Car Brake and Starter, of which the following is a specification:

In the accompanying drawings, Figure 1 represents a vertical longitudinal section of my improved car brake and starter on line $x$ $x$, Fig. 2; Fig. 2, a top view; Fig. 3, a vertical transverse section of the same on line $y$ $y$, Fig. 1.

Similar letters of reference indicate corresponding parts.

The object of my invention is to provide for street-cars and other purposes an improved rotary cumulative brake, by which the power lost in stopping the car is stored and utilized for starting the same; and the invention consists of friction-wheels worked by contact with the car-wheels when applied by the brake-lever, producing the winding up of one or more springs, and the locking of the same by pawl-and-ratchet devices on the shafts of the friction-wheels until the pawls are released by a treadle, and the power stored up in the springs applied to the wheels for starting the car.

The brake mechanism may be used in either direction, the friction-wheel shafts sliding in guide-slots of the car-frame.

In the drawing, A represents the bottom frame of the car, which is supported on wheels B, in connection with which the friction-wheels C, of corresponding shape, are used. The shafts C' of the friction-wheels C are supported in slotted side supports A' of the car-frame, so as to be moved against either set of wheels B, and form contact therewith, according to the direction in which the car is traveling.

The friction-wheel shafts C' are connected by longitudinal pieces D, which are jointed at the ends, and attached by pivot-links $a$ to a brake-lever, E, which may be arranged at one or both ends of the car, and operated by the driver in the customary manner.

By pulling the lever forward the friction-wheels are brought in contact with the circumference of the car-wheels, acting in the nature of brake-shoes thereon, but taking up the motion of the same, and transmitting the power by the shafts C' to coiled springs F, which are attached to the shafts and the connecting-pieces D, and inclosed in suitable manner.

A second set of springs, F, is called into play by pulley and cross-belt or chain-connection of the shaft of the front friction or brake wheels with a pulley of the shaft of the rear wheels C, so as to accumulate or store up in this manner the forward motion of the car until the same is at rest.

The cumulative springs F are retained in wound-up state by pawls G, which are fulcrumed to the connecting-pieces D, and jointed at the inner ends, and by fixed ratchet-wheels $G^1$ of the shafts C'.

As soon as the car is desired to be started the brake-lever is held in backward direction, so as to press the friction-wheels against the car-wheels, but, at the same time, a treadle, $G^2$, operated by the foot, lifts one pawl out of the ratchet, said pawl releasing, by its pivot-joint, the second pawl, so as to throw the joint power of the springs on the friction-wheels, and by the same on the car-wheels, assisting thereby materially in starting the car.

The springs of one shaft, C', coil in opposite direction to that of the other, the teeth of the ratchet-wheels being also arranged in opposite direction to each other, so as to admit the cumulative working of the brake and starting device in either direction.

The car brake and starter may be readily applied to any car by providing merely the slotted side supports, brake-levers, and treadles, the device being also conveniently detached for repairs, as all the parts are supported on the connecting-pieces of the shafts of the friction-wheels.

I do not claim the use of cumulative springs and friction-brake mechanism for storing and re-applying power for the purpose of starting cars.

Having thus described my invention, I claim as new and desire to secure by Letters Patent—

1. The combination, with car-wheels B, of the pair of ratchet-wheels $G^1$, having teeth set in opposite directions, their pulleys and connecting-cord, the pawls G G, the pair of shafts C' C', carrying friction-wheels C C, and connected by a rigid frame, D, and the cumulative springs F F, all arranged as shown and described, to operate as specified.

2. The combination of the slotted side supports of the car with sliding friction-brake mechanism and car-wheels B, to apply the brake to front or rear set of car-wheels, substantially as specified.

ALEXANDER WINSTON.

Witnesses:
A. J. DUNCAN,
W. A. HOYT.